United States Patent [19]
Sawada et al.

[11] 3,754,847
[45] Aug. 28, 1973

[54] FLAT-DIE FOR EXTRUDING LAMINATED SYNTHETIC RESIN SHEETS

[75] Inventors: Takehiko Sawada; Takesi Fujisawa, both of Kawasaki, Japan

[73] Assignee: Ikegai Tekko Kabushiki Kaisha, Tokyo, Japan

[22] Filed: June 28, 1971

[21] Appl. No.: 157,180

[30] Foreign Application Priority Data
July 23, 1970 Japan.........45/73024 (utility model)

[52] U.S. Cl................. 425/131, 425/204, 156/500, 425/462
[51] Int. Cl................................................ B29f 3/02
[58] Field of Search.................... 425/131, 132, 204, 425/462; 156/500; 264/171

[56] References Cited
UNITED STATES PATENTS
3,217,358  11/1965  Kihara ................................. 425/376
R26,237    7/1967  Rowland ......................... 425/131 X
3,400,190  9/1968  Donald .............................. 264/171
3,462,332  8/1969  Goto ............................... 156/500 X FOREIGN PATENTS OR APPLICATIONS
962,746    4/1957  Germany ........................... 425/204

Primary Examiner—J. Spencer Overholser
Assistant Examiner—Michael O. Sutton
Attorney—E. F. Wenderoth, V. M. Creedon et al.

[57] ABSTRACT

A flat-die for extruding laminated synthetic resin sheets is composed of a plurality of flow passages for resins, each of which is connected, at its one end, to a hollow distributing chamber containing a distributing screw to be supplied with the resin from respective extruders and terminates in a lip at its other end, said lips being arranged so that they provide a number of openings lying side by side.

2 Claims, 4 Drawing Figures

Patented Aug. 28, 1973

TAKEHIKO SAWADA and
TAKESI FUJISAWA,
INVENTORS

BY Wenderoth Lind & Ponack

ATTORNEYS

TAKEHIKO SAWADA and
TAKESI FUJISAWA,
INVENTORS

FLAT-DIE FOR EXTRUDING LAMINATED SYNTHETIC RESIN SHEETS

BACKGROUND OF THE INVENTION

This invention relates to a die for extruding synthetic resin sheets, and more particularly to a flat-die for extruding so-called laminated synthetic resin sheets.

A laminated sheet of synthetic resin which is composed of an inner layer of thermoplastic resins such as foamed plastics, reinforced plastics, general plastics, etc. and outer layers of thermo-plastic resins such as general resins, etc. can effectively prevent the inner layer from deteriorating, for example. For instance, in the case of a foamed plastic sheet, since the degradation of its physical properties is rapid, in extruding it through a die, unless the die lip is cooled so as to maintain it at a proper lower temperature, the sheet surfaces have a tendency to adhere to the lip inner surfaces resulting in the surfaces becoming rough.

Accordingly, if the outer surfaces of such a sheet are compositely laminated with general synthetic resins, on the one hand, the physical properties (strength, weatherability, etc.) of the sheet are improved, and, on the other hand, since the extrudability of the resins is excellent, broader or thicker sheets with good surface qualities can be obtainable.

Further, resins having poor fluidity such as reinforcement containing resins or those having an inclination worsen the extruded sheet surfaces can be given surfaces with such good qualities that they can be printed thereon if they surfaces thereof are compositely laminated with sheets of thermoplastic resins of different proper kinds.

And, since, the general synthetic resins (ABS polymer, polystyrene, polyvinylchloride, polypropylene, polyester etc.) have poor weatherability nevertheless they are relatively low in price, so that if their outer surfaces are compositely laminated with thin sheets of resins having good weatherability but having relatively higher price, such as polycarbonate, their weatherability is improved so that their fields of application fields are expanded.

However, such compositely laminated resin sheets have not hitherto been manufactured industrially by conventional extruders with flat-dies, because the conventional flat-dies could treat only a single synthetic resin.

SUMMARY OF THE INVENTION

It is an object of the present invention to provide a flat-die which is especially suitable to manufacture compositely laminated synthetic resin sheets adapted to be used in association with a plurality of extruders.

It is another object of the present invention to provide a flat-die for extruders which is capable of extruding composite laminated synthetic resin sheets having a sandwich construction composed of different resins or identical resins but with different colours.

According to the present invention, a flat-die for extruders is provided for manufacturing compositely laminated synthetic resin sheets which comprises a plurality of distributing screws each disposed within a hollow distributing chamber, each of the hollow distributing chamber being adapted to be connected with respective corresponding extruders, and a number of flow passages for resins leading from the respective hollow distributing chambers to a common extruding orifice, said flow passages being separated from each other so that the resins extruded from the respective hollow distributing chambers are brought into contact only after they flow outside the common extruding orifice.

BRIEF DESCRIPTION OF THE DRAWINGS

The invention will now be described in detail with reference to the accompanying drawings, in which.

Figure 1:
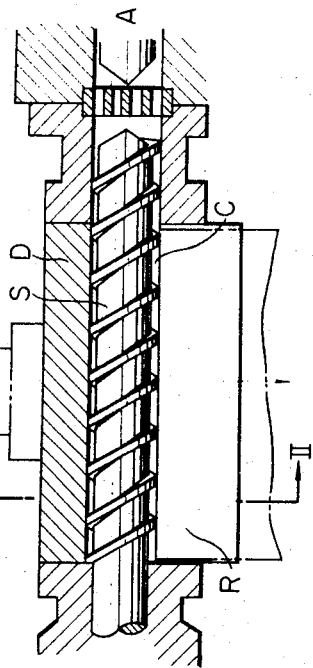
FIG. 1 is an axial sectional plan view of a conventional flat-die for extruding a synthetic resin sheet taken along the line I—I of FIG. 2.
Figure 2:
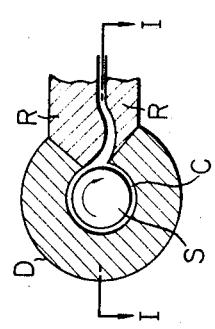
FIG. 2 is a cross sectional view taken along the line II—II of FIG. 1.

In a conventional flat-die, as shown in FIGS. 1 and 2, a distributing screw S is disposed within a hollow distributing chamber C of a die body D, which communicates with a cylinder of an extruder A arranged in alignment with the screw S or an extruder B arranged orthogonally to the direction of the screw S, and resins which have been made gelatinous in the extruder A or B are extruded by the rotating screw S so that they are uniformly distributed over the whole width of the die body D through its lip R.

It will be appreciated that such a conventional flat-die as shown in FIGS. 1 and 2 serves only to extrude a single resin into a sheet, without making possible extrusion of compositely laminated synthetic resin sheets.

DESCRIPTION OF THE PREFERRED EMBODIMENT

Figure 4:
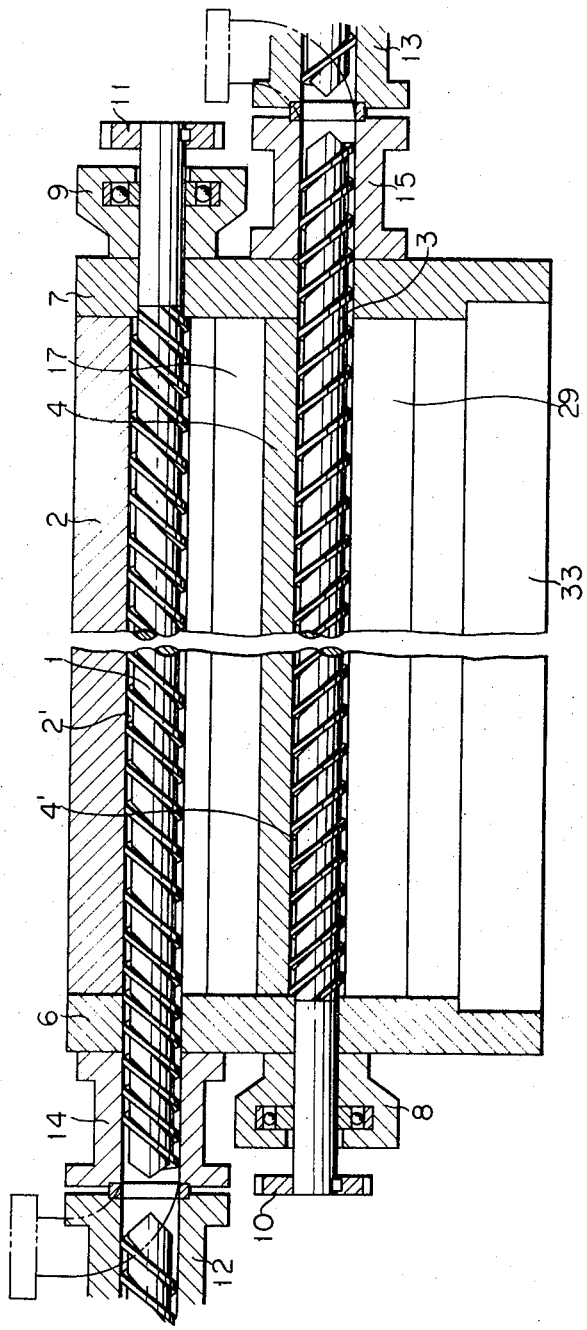
FIG. 4 is an axial sectional plan view taken along the line IV — IV of FIG. 3.
Figure 3:
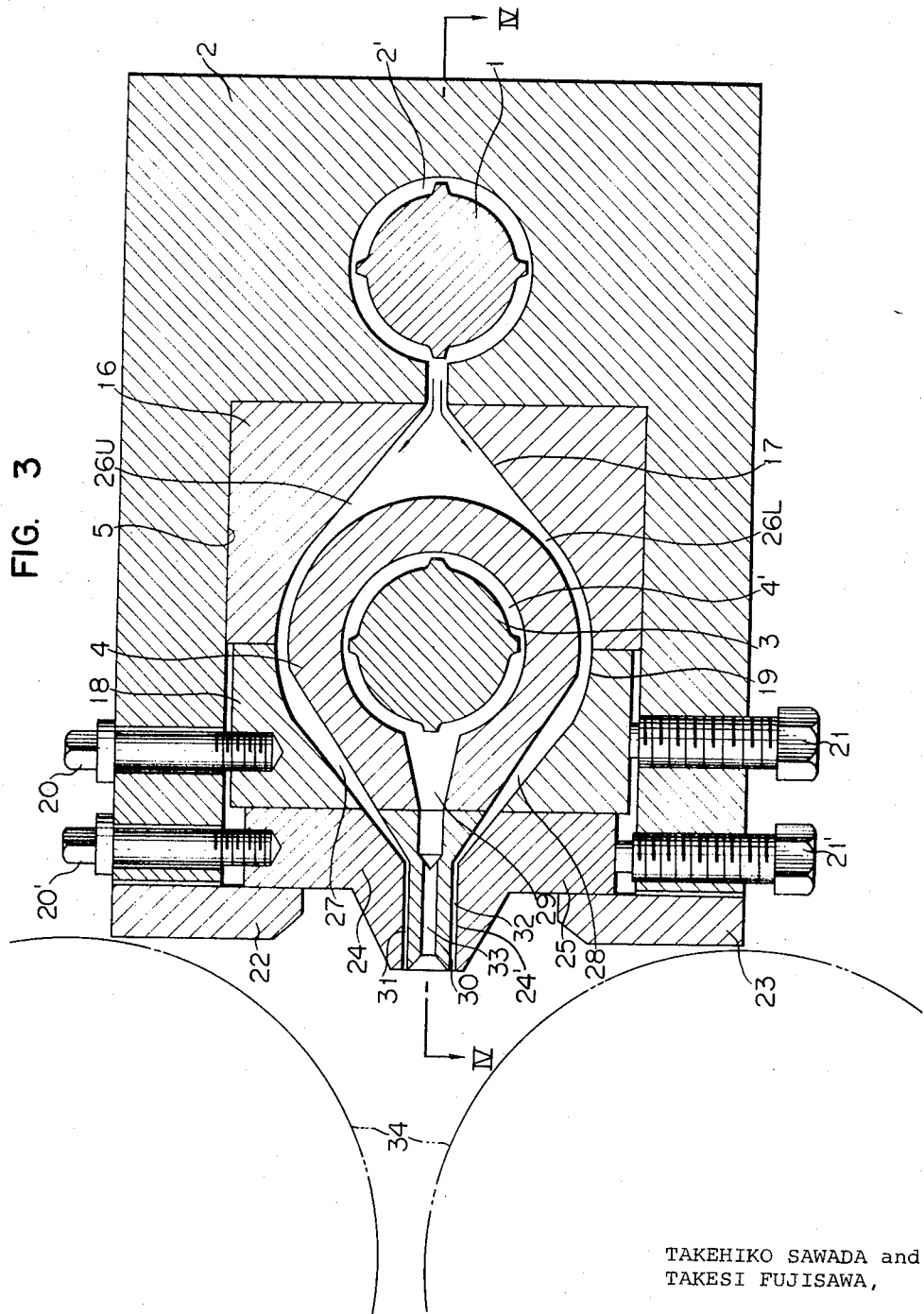
FIG. 3 is an enlarged transverse sectional view of an embodiment of the flat-die according to the present invention.

Referring to FIGS. 3 and 4 showing an embodiment of the present invention wherein two distributing screws are provided, a first distributing screw 1 is disposed within a hollow cylindrical chamber 2' of a first die body 2 and a second distributing screw 3 a hollow chamber 4' of a second die body 4, thereby second die body 4 is located within a hollow chamber 5 having a rectangular crossection formed in first die body 2 so that first and second distributing screws 1 and 3 are parallel to each other, second die body 4 being held in place through end plates 6 and 7 fixedly secured to first die body 2 at each end by such means as stud bolts (not shown).

Distributing screws 1 and 3 are rotatably supported within hollow chambers 2' and 4' respectively and journaled at their one ends in bearing boxes 9 and 8, respectively, which are fixedly secured to end plates 7 and 6 by any suitable means such as stud bolts (not shown).

As shown in FIG. 4, distributing screws 1 and 3 are adapted to be rotated through sprocket wheels or gears 11, 10, respectively keyed thereto at their one ends adjacent bearing boxes 9 and 8. At the ends of distributing screws 1 and 3 opposite to gears 11, 10, there are arranged extruders 12 and 13, respectively, so that their cylinders communicate with hollow chambers 2' and 4', respectively, through connecting cylinders 14 and 15 disposed between the extruders and the distributing screws, and extruders 12 and 13 are adapted to supply melted gelatinized synthetic resins to hollow chambers 2' and 4', respectively, of first and second die bodies 2 and 4.

Disposed within the rectangular hollow chamber 5 of first die body 2 is, as shown in FIG. 3, a flow guide 16 having a central hollow chamber 17, which spreads transversally the whole width of die body 2 and has a flaring configuration communicating with hollow chamber 2' of first die body 2 through its lip, flow guides 16 forming upper and lower flow passages 26U and 26L in association with the substantially cylindrical outer right-half surface, as viewed in FIG. 3, of second die body 4 disposed within hollow chamber 17. Disposed within rectangular hollow chamber 5 of first die body 2 and abutting the downstream end surface of flow guide 16 is a spacer 18 having a central hollow chamber 19, which spreads transversally the whole width of die body 2 and has a flaring configuration starting from the diverging end surface of hollow chamber 17 of flow guide 16 to converge in the flow direction, that is, toward the left as viewed in FIG. 3, and spacer 18 forms upper and lower flow passages 27 and 28 in association with the substantially V-shaped outer left-half surface, as viewed in FIG. 4, of second die body 4.

A mouth piece 24 having a central opening 24' spreading transversally the whole width of die body 2 is disposed within rectangular hollow chamber 5 of first die body 2 in abutting relation with the down stream end surface of spacer 18, and opening 24' flares outwardly in the upstream direction, i.e., to the right in FIG. 3, at substantially its mid point so as to be flush with the surfaces of hollow chamber 19 of spacer 18.

Spacer 18 and mouth piece 24 are provided with a number of drag bolts 20, 20' and push bolts 21, 21', respectively, disposed in the upper and lower portions of first die body 2 in the transverse direction at any suitable intervals so that the areas of flow passages 27 and 28 can be regulated.

The flow guide 16, spacer 18 and mouth piece 24 are mounted together within rectangular hollow chamber 5 of first die body 2 by die fixing plates 22, 23 secured to the end of first die body 2 by means such as tap bolts (not shown).

Connected to the end surface of second die body 4 and disposed within central opening 24' of mouth piece 24 is a nozzle piece 30 having a nozzle orifice 33 passing therethrough centrally and communicating with hollow chamber 4' of second die body 4 through a passage 29 formed therein, so that between the surfaces of opening 24' of mouth piece 24 and the outer surfaces of nozzle piece 30, which has a configuration similar to that of opening 24', there are formed upper and lower flow passages 31 and 32, which both flow passages 31 and 32 communicate with flow passages 27 and 28, respectively.

Flow passages 31, 32 and nozzle orifice 33 terminate substantially in a common vertical plane, whereby the walls defining opening 24' and the outer surfaces of nozzle piece 30 form a set of die-lips for the resins distributed by distributing screw 1, while nozzle orifice 33 acts as a lip for the resin distributed by distributing screw 4.

Having thus described the elements comprising a preferred embodiment of a flat-die according to the present invention, its operation will now be briefly described. It will be assumed that extruders 12, 13 and distributing screws 1, 3 are in continuous rotation.

Synthetic resins respectively melted in extruders 12 and 13 are supplied to distributing chambers 2' and 4', respectively, and uniformly extruded over their whole width through their openings by first and second distributing screws 1 and 3, respectively, whereby the resin distributed by first distributing screw 1 is extruded through flow passages 31 and 32 via flow passages 26U, 27; 26L, 28 so that it forms a set of outer resin sheets, while, the resin distributed by second distributing screw 3 is extruded through nozzle orifice 33 via flow passage 29 as an inner resin sheet. The outer and inner resin sheets thus extruded are withdrawn by cooling rollers 34 or the like so that a compositely laminated resin sheet with a desired thickness is manufactured after the respective sheets have passed between rollers 34.

It will be appreciated that, according to the present invention, synthetic resing sheets having a sandwich construction of various kinds can be made such as resin sheets of different colours made of different or identical resins.

While the invention has been shown and described with reference to a preferred embodiment thereof, it will be apparent that other changes and modifications can be made in the present invention and therefore it is understood that all changes, equivalents, and modifications within the spirit and scope of the present invention are here meant to be included.

What is claimed is:

1. A flat die for extruding laminated synthetic resin sheets, comprising a common die body, a first elongated distributing chamber in said body, an elongated hollow chamber in said body generally parallel to said first distributing chamber and having an elongated lateral opening from one side thereof, said first distributing chamber having an elongated lateral opening therein opening into the other side of said hollow chamber, a second elongated distributing chamber within said hollow chamber and spaced from the walls thereof to define with said hollow chamber two flow passages around the opposite sides of said second distributing chamber, said second distributing chamber having an extension thereon extending into the elongated lateral opening on the one side of said elongated hollow chamber and having an elongated opening therein, said extension being spaced from the elongated opening to define extensions of the two flow passages around said second distributing chamber, and an extruder screw in each of said distributing chambers.

2. A flat die as claimed in claim 1 in which said common die body has a recess therein, a flow guide in said recess defining the portion of said hollow chamber on the side of said second distributing chamber toward said first distributing chamber, a spacer in said recess against said flow guide defining the portion of said hollow chamber toward said lateral opening from said hollow chamber, and a mouthpiece in said recess against said spacer and having said lateral opening from said hollow chamber therein, and retaining means on said die body engaging said mouthpiece for holding said flow guide, said spacer and said mouthpiece in said recess.

* * * * *